United States Patent
Ellis et al.

(10) Patent No.: US 10,855,740 B1
(45) Date of Patent: Dec. 1, 2020

(54) NETWORK PROBLEM NODE IDENTIFICATION USING TRACEROUTE AGGREGATION

(71) Applicant: Microsoft Technology Licensing, LLC, Redmond, WA (US)

(72) Inventors: Martin Ellis, Pittsburgh, PA (US); Ross Cutler, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/506,798

(22) Filed: Jul. 9, 2019

(51) Int. Cl.
| | | |
|---|---|---|
| *H04L 29/06* | (2006.01) | |
| *H04L 12/26* | (2006.01) | |
| *H04L 12/24* | (2006.01) | |

(52) U.S. Cl.
CPC ............ *H04L 65/80* (2013.01); *H04L 41/064* (2013.01); *H04L 41/069* (2013.01); *H04L 43/045* (2013.01); *H04L 43/10* (2013.01)

(58) Field of Classification Search
CPC ..... H04L 65/00–80; H04L 41/00–5096; H04L 43/00–50
See application file for complete search history.

(56) References Cited

U.S. PATENT DOCUMENTS

| | | |
|---|---|---|
| 7,277,936 B2 | 10/2007 | Frietsch |
| 8,189,489 B2 | 5/2012 | Zhang et al. |
| 8,270,313 B2 | 9/2012 | Tao et al. |
| 8,295,191 B2 | 10/2012 | Leung et al. |
| 8,868,715 B2 | 10/2014 | Bearden et al. |
| 2006/0246844 A1 | 11/2006 | Kroboth et al. |
| 2008/0052628 A1 | 2/2008 | Bugenhagen et al. |
| 2012/0008496 A1 | 1/2012 | Saavedra |
| 2013/0250786 A1 | 9/2013 | Balasaygun et al. |

(Continued)

FOREIGN PATENT DOCUMENTS

WO     2017216097 A1     12/2017

OTHER PUBLICATIONS

"Configure Business Locations with a Device Attribute (Legacy Location Mapping)", Retrieved from: https://help.aternity.com/bundle/console_admin_guide_9_0_server_local/page/console/topics/console_admin_location_config_legacy.html, Retrieved Date: Apr. 22, 2019, 10 Pages.

(Continued)

*Primary Examiner* — Clayton R Williams
(74) *Attorney, Agent, or Firm* — Workman Nydegger

(57) ABSTRACT

Computer-aided identification of a potential problem node in a network. As part of data collection, a computing system gathers telemetric and trace route data for communications that occur within a network. Upon detecting that a performance problem has occurred within the network, multiple communications that occurred around the time of the performance problem are identified. Then, the trace route data for these multiple communications are aggregated. The aggregated data may then be used to identify a potential problem network node within the network. The identity of the potential problem network node (and potentially observed telemetry for that network node) may then be communicated to an entity that is affected by the performance problem. This may allow the entity to understand which network node is causing the problem and thus take appropriate remedial measures.

20 Claims, 7 Drawing Sheets

(56) References Cited

U.S. PATENT DOCUMENTS

| | | | | |
|---|---|---|---|---|
| 2017/0126475 A1* | 5/2017 | Mahkonen | | H04L 43/04 |
| 2017/0187602 A1* | 6/2017 | Pathela | | H04L 41/0631 |
| 2017/0237851 A1* | 8/2017 | Hassan | | H04M 7/006 |
| | | | | 370/252 |
| 2017/0347308 A1* | 11/2017 | Chou | | H04L 43/08 |
| 2018/0204129 A1* | 7/2018 | Vasseur | | G06N 7/005 |
| 2018/0212849 A1 | 7/2018 | Hobgood et al. | | |

OTHER PUBLICATIONS

Calder, et al., "Odin: Microsoft's Scalable Fault-Tolerant {CDN} Measurement System", in Proceedings of the 15th USENIX Symposium on Networked Systems Design and Implementation, Apr. 9, 2018, pp. 501-517.

Darrell, et al., "twitter/AnomalyDetection", Retrieved from: https://github.com/twitter/AnomalyDetection, Retrieved Date: Apr. 22, 2019, 3 Pages.

Zhang, et al., "Secure and Scalable Fault Localization under Dynamic Traffic Patterns", in Proceedings of IEEE Symposium on Security and Privacy, May 20, 2012, pp. 317-331.

"International Search Report and Written Opinion Issued in PCT Application No. PCT/US2020/033334", dated Aug. 10, 2020, 15 Pages.

* cited by examiner

NETWORK PROBLEM NODE IDENTIFICATION USING TRACEROUTE AGGREGATION

BACKGROUND

Conventional computing systems presently provide a wide assortment of computing functionality often in the form of applications, operating system functionality, and/or other computing logic. Much of this functionality relies on the ability to communicate with other computing systems over a network. For instance, e-mail, web navigation, instant messaging, Internet calls, online conferencing and collaboration, cloud-based storage and processing are all examples of applications that rely upon the proper functioning of networks.

When a message is communicated from one computing system to another over a network, that message is typically routed through several intermediary systems (also called "routers"). For any given message, it is possible to trace the route that the message has taken to get from its origin to its destination. Such as description of the route of a message is often termed a "trace route". For instance, a trace route might contain an ordered list of Internet Protocol (IP) addresses beginning at the origin IP address, through the various intermediary systems (e.g., routers, firewalls, gateways, and so forth) and ending at the destination IP address.

Like every complex system, networks have a variety of ways in which they can fail to achieve their best function. For instance, an intermediary system might experience a hardware failure, be misconfigured, having insufficient resources, fail to dynamically adapt to increased traffic, experience an unanticipated state, suffer software failure, dispatch messages along inefficient routes, and any of a variety of different mechanisms of possible failure.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

Embodiments disclosed herein relate to the computer-aided identification of a potential problem node in a network. As part of data collection, a computing system gathers telemetric and trace route data for communications that occur within a network. Upon detecting that a performance problem has occurred within the network, multiple communications that occurred around the time of the performance problem are identified. As an example, the gathered telemetric and trace route data may itself be used in order to detect the performance problem in the first place.

Then, the trace route data for these multiple communications are aggregated. For instance, the aggregation may take the form of a graph in which each node of the graph represents a discrete network node. The aggregation may also aggregate the gathered telemetric data. For instance, an aggregated telemetry for a given network node may represents an aggregation of the telemetry for at least some of the communications that passed the associated network node.

The aggregated data may then be used to identify a potential problem network node within the network to allow for further investigation. For instance, the aggregated telemetry for a given node may itself reveal performance issues associated with that network node. The identity of the problem network node (and potentially observed telemetry for that network node) may then be communicated to an entity that is affected by the performance problem. This may allow the entity to understand which network node is potentially causing the problem and thus make appropriate investigation and remedial measures. Thus, network performance problems may be quickly analyzed to identify and remedy problematic network nodes that contribute to the network performance problems. Accordingly, the principles described herein advance the art of network performance troubleshooting.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments disclosed herein relate to the computer-aided identification of a potential problem node in a network. As part of data collection, a computing system gathers telemetric and trace route data for communications that occur within a network. Upon detecting that a performance problem has occurred within the network, multiple communications that occurred around the time of the performance problem are identified. As an example, the gathered telemetric and trace route data may itself be used in order to detect the performance problem in the first place.

Then, the trace route data for these multiple communications are aggregated. For instance, the aggregation may take the form of a graph in which each node of the graph represents a discrete network node. The aggregation may also aggregate the gathered telemetric data. For instance, an aggregated telemetry for a given network node may represents an aggregation of the telemetry for at least some of the communications that passed the associated network node.

The aggregated data may then be used to identify a potential problem network node within the network to allow for further investigation. For instance, the aggregated telemetry for a given node may itself reveal performance issues associated with that network node. The identity of the problem network node (and potentially observed telemetry for that network node) may then be communicated to an entity that is affected by the performance problem. This may allow the entity to understand which network node is potentially causing the problem and thus make appropriate investigation and remedial measures. Thus, network performance problems may be quickly analyzed to identify and remedy problematic network nodes that contribute to the network performance problems. Accordingly, the principles described herein advance the art of network performance troubleshooting.

Figure 1:
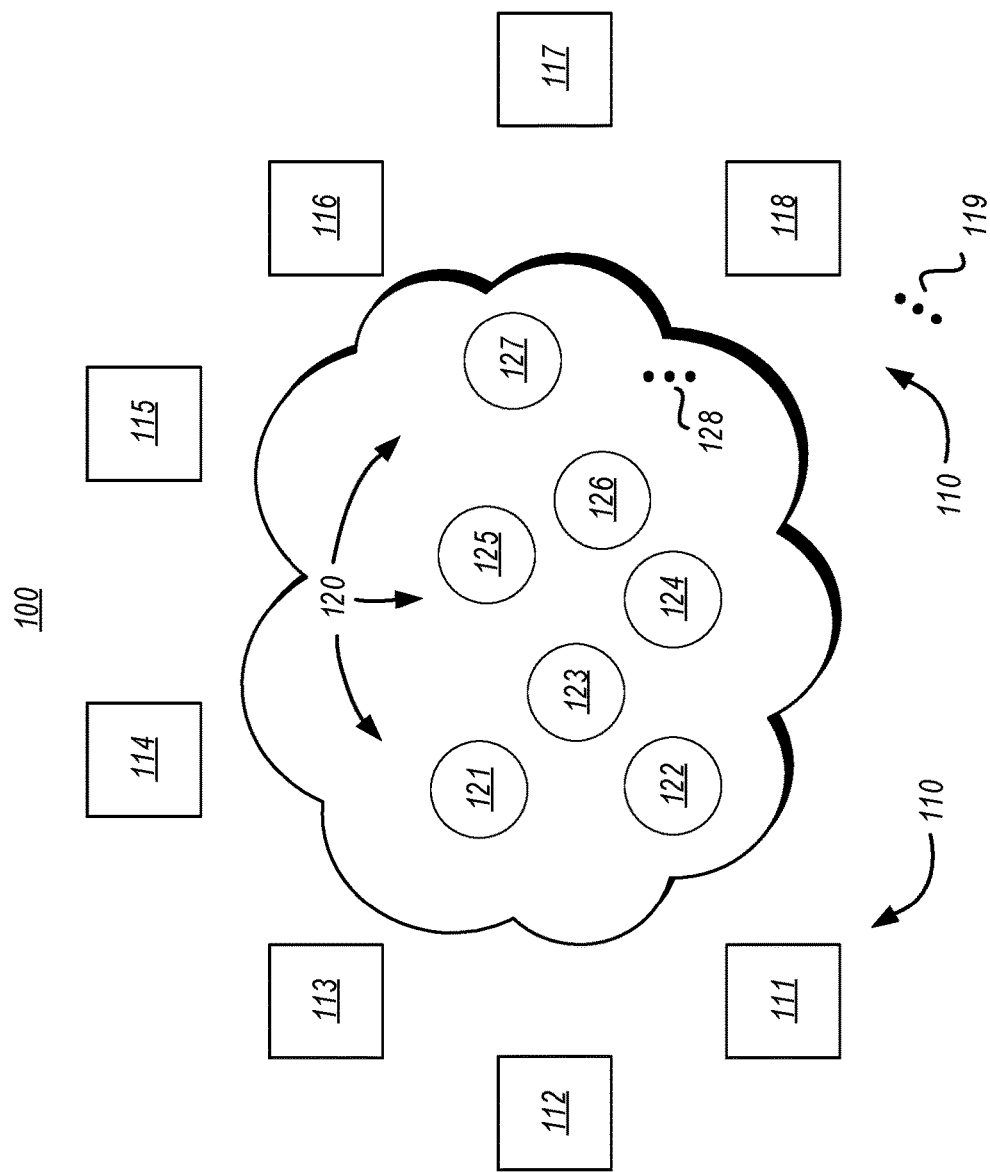
FIG. 1 illustrates a network environment in which the principles described herein may operate, which includes multiple computing systems that communicate via multiple intermediary systems.

FIG. 1 illustrates a network environment 100 in which the principles described herein may operate. The network environment 100 includes a network 101 and a number of computing systems 110 (each being represented with a square) that can connect to the network 101 so as to be able to receive messages from and/or transmit message over the network 101. The network 101 also includes a number of intermediary systems 120 (each being represented by a circle, also referred to as an "intermediary") through which a message may pass as it travels from one of the computing systems 110 to another of the computing systems 110. As an example, an intermediary might be a firewall, a gateway, a router, or the like. Each of the computing systems 110 and the intermediaries 120 may be structured as described below for the computing system 700 of FIG. 7.

The network 101 may be a relatively small network, such as a small local area network. On the other extreme, the network 101 may expand across the globe and include innumerable computing systems, such as the Internet. The network 101 may also include any network in-between these two extremes. As more specific examples, the network 101 might be a home network, an enterprise network, an Internet Service Provider (ISP) network, a transit network, a cloud provider network, combinations of the above, and so forth. The fact that the computing systems 110 are illustrated as including only eight computing systems 111 through 118 is thus merely for example purposes only. The ellipsis 119 represents that the principles described herein are not limited to the particular nature, size or complexity of the network. Furthermore, the ellipsis 119 represents that the number of computing systems 110 that are used to communicate messages over the network 101 may be static or dynamic, with computing systems 110 being added to and/or removed from the network 101 over time. Likewise, although only seven intermediaries 121 through 127 are illustrated as being included within the intermediaries 120 within the network 101, the ellipsis 128 represents that the principles described herein are not limited to the number of intermediaries within the network 101.

Figure 2:
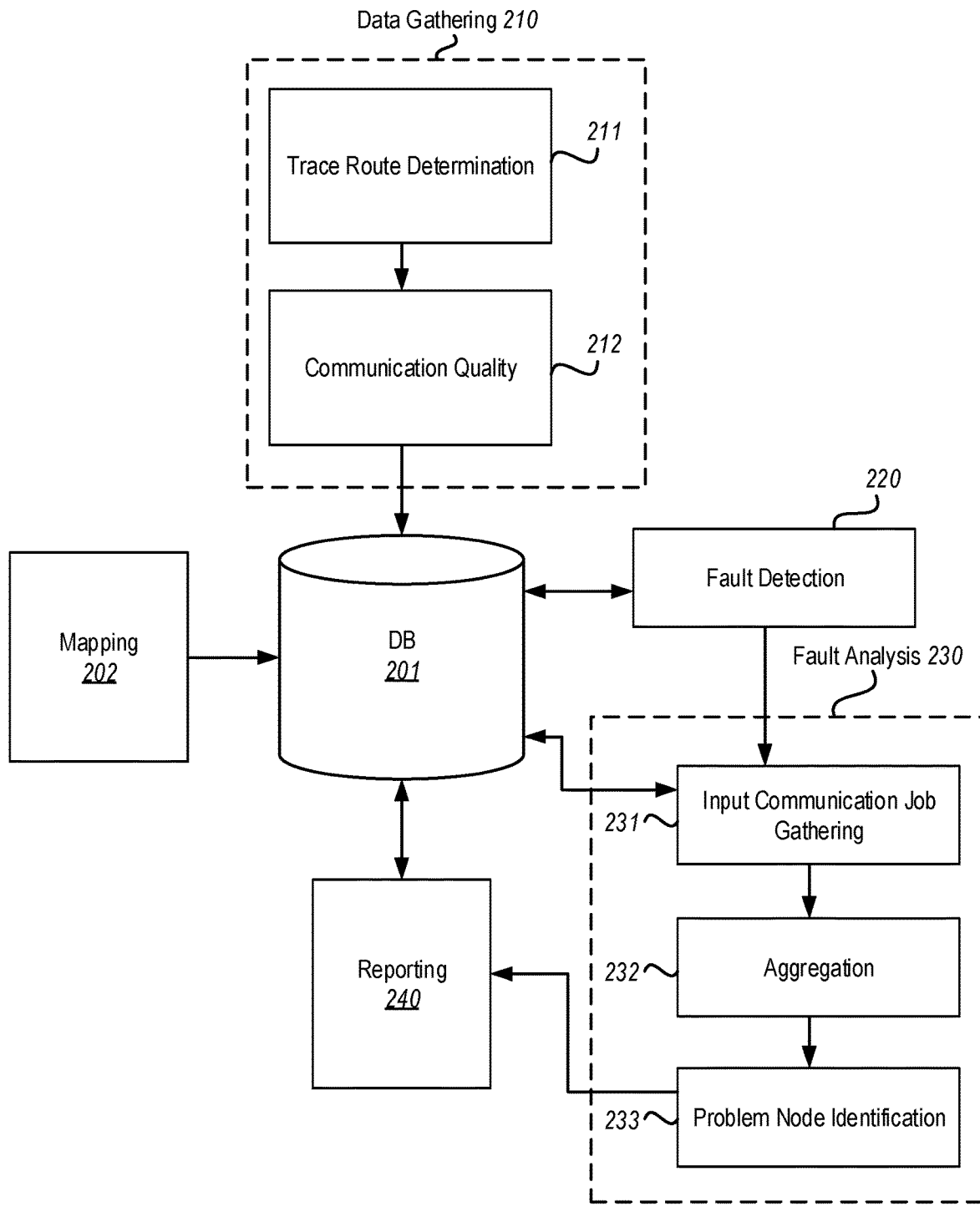
FIG. 2 illustrates a computing environment that may be used to evaluate the network environment of FIG. 1.

FIG. 2 illustrates a computing environment 200 that may be used to evaluate the network environment 100 of FIG. 1. The computing environment 200 includes data gathering components 210, fault detection component 220, fault analysis components 230, and reporting component 240. Each of these components may be structured as described below for the executable component 706 of FIG. 7. Furthermore, the computing environment 200 may be operated using one computing system, or a distribution of multiple computing systems. The computing environment 200 also includes a database 201 for storing gathered data. Potentially, the computing environment 200 includes a mapping 202 of network addresses to physical locations and/or entities that are responsible for maintaining the network node.

Figure 7:
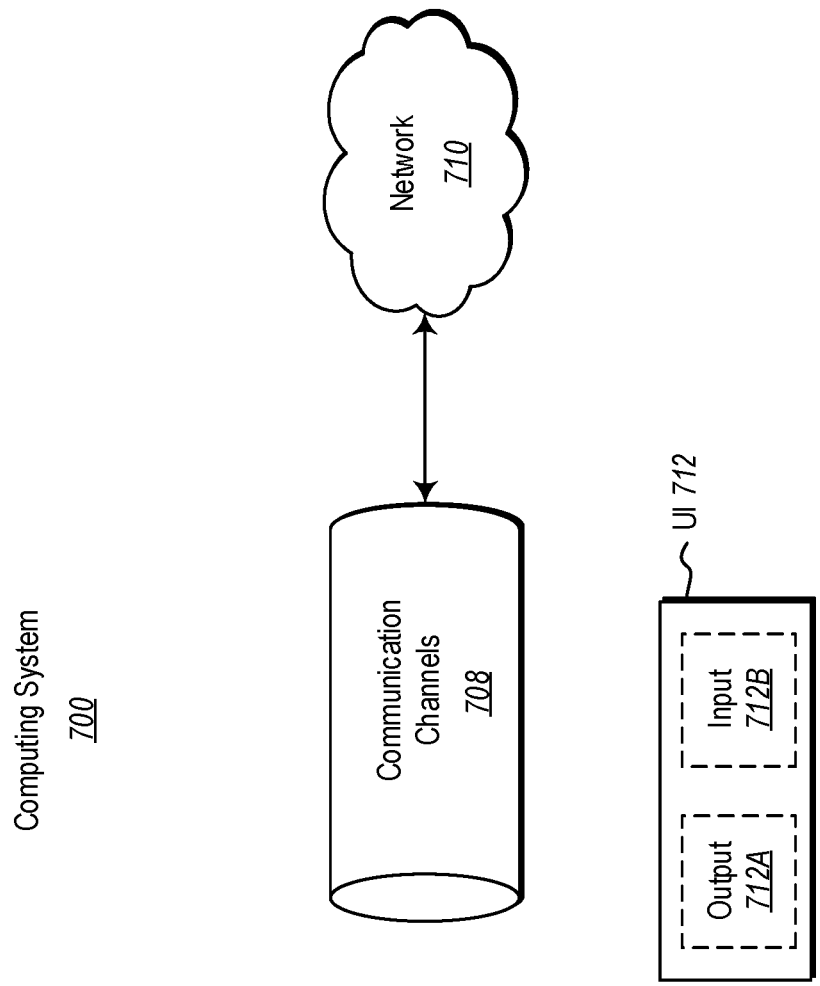
FIG. 7 illustrates an example computing system in which the principles described herein may be employed.

As an example, if the computing environment 200 is operated using the computing system 700 of FIG. 7, the various components 210, 220, 230 and 240 may perform their operations in response to the processing unit 702 executing computer-executable instructions that are in the memory 704. Furthermore, the components 210, 220, 230 and 240 may be instantiated in the memory in response to the processing unit 702 executing computer-executable instructions.

Figure 3:
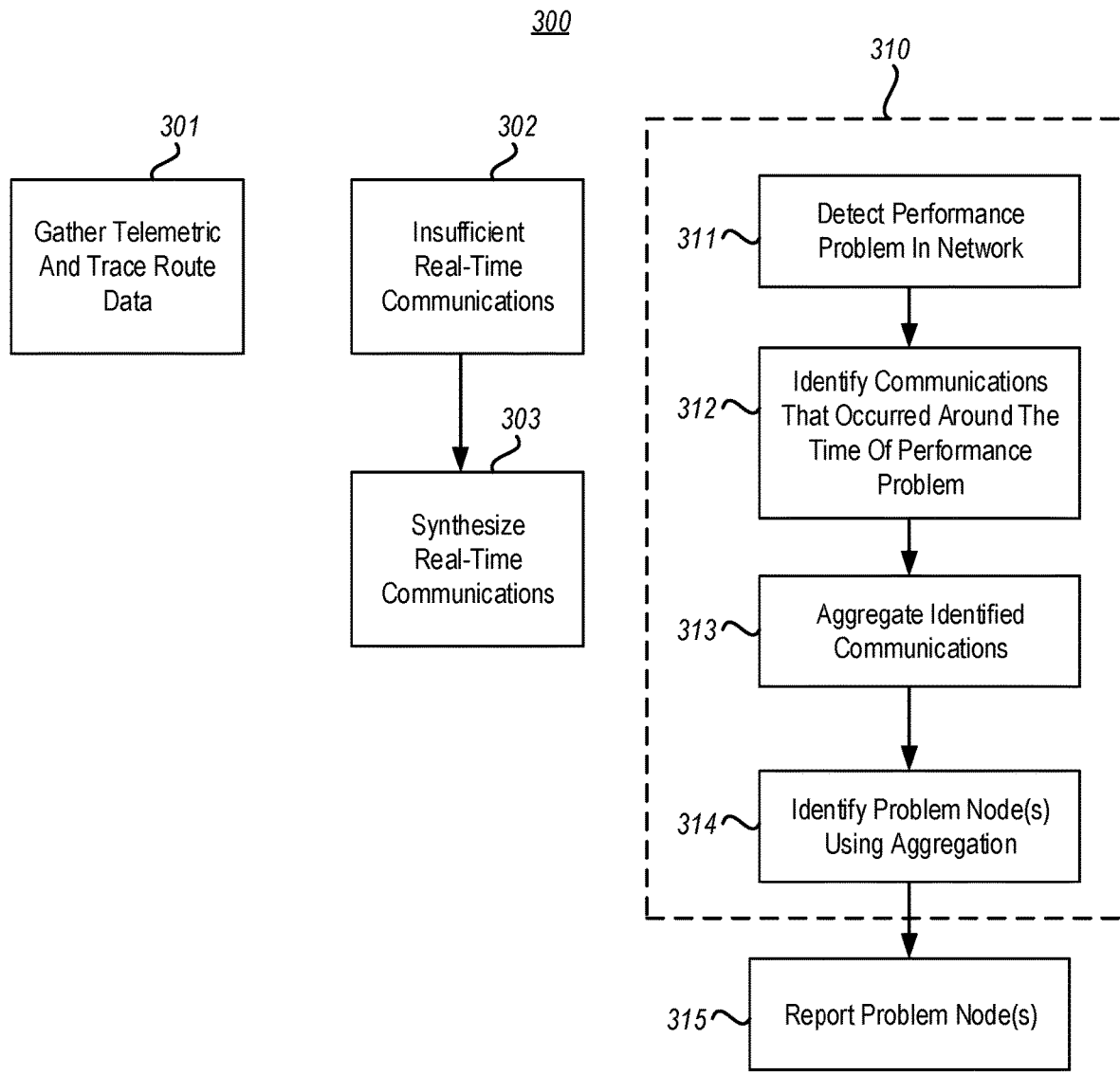
FIG. 3 illustrates a flowchart of a method for computer-aided identification of a potential problem network node in a network in response to detecting that a performance problem has occurred in the network.

FIG. 3 illustrates a flowchart of a method 300 for computer-aided identification of a potential problem node in a network in response to detecting that a performance problem has occurred in the network. As an example only, the method 300 may be performed using the computing environment 200 of FIG. 2 in order to identify potential problem nodes in the network environment 100 of FIG. 1. Accordingly, the method 300 of FIG. 3 will now be described with frequent reference to FIGS. 1 and 2 as an example.

The method 300 includes gathering telemetric and trace route data (act 301) for each of multiple real-time communications that occurred within a network. This gathering act (act 301) is shown independent of the other acts within the method 300, to emphasize that there is no restricted temporal dependency upon other acts within the method 300. As an example only, the telemetric and trace route data may be gathered (act 301) continuously, as real-time communications are performed. As an example, the real-time communication might be a telephonic communication (e.g., Voice over IP), a video call, an online conference communication, or the like.

Figure 4:
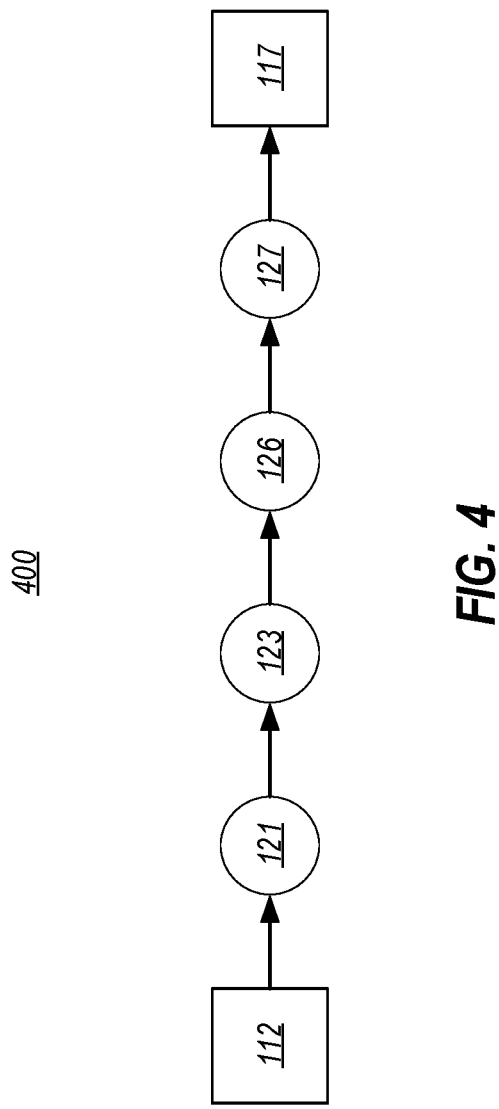
FIG. 4 illustrates an example network path taken by a real-time communication.

FIG. 2 illustrates that the data gathering components 210 includes a trace route determination component 211, that may gather the trace route information for each of multiple real-time communications. Thus, the trace route determination component may perform part of the gathering act (act 301) of FIG. 3. FIG. 4 illustrates an example network path 400 taken by a real-time communication. The example network path 400 has an origin node of computing system 112. The communication passes through intermediaries 121, 123, 126 and 127 in that order, and then arrives at a destination node of computing system 117. In this example, the trace rout determination component 211 would gather an ordered list of Internet Protocol (IP addresses) for this communication.

FIG. 2 illustrates that the data gathering components 210 also include a communications quality component 212, which estimates the quality of the communication for each real-time communication for which the trace route determination component 211 determined the trace route. For instance, the communication quality component 212 might gather end-to-end telemetric data collected from the endpoints of a real-time communication. As an example, in the case of communication 400, the communications quality component 212 may gather end-to-end telemetry from each or both of the computing systems 112 and 117. For instance, the telemetry might include whether there was (and/or degree of) jitter, delay, packet loss, or even whether the connection was dropped (e.g., if the communication was a call, whether the call was dropped).

Other communication quality metrics might be what the average and/or median signal to noise ratio was, user feedback metrics (whether there was a user complaint, how the user rated the call quality, and so forth), whether there was and the degree of any glitching in the real-time communication, and so forth. Thus, the communication quality component 212 may also perform part of the gathering act (act 301) of FIG. 3. The telemetrics and associated trace route data for each monitored communication is stored (e.g., in the database 201 of FIG. 2).

Figure 5:
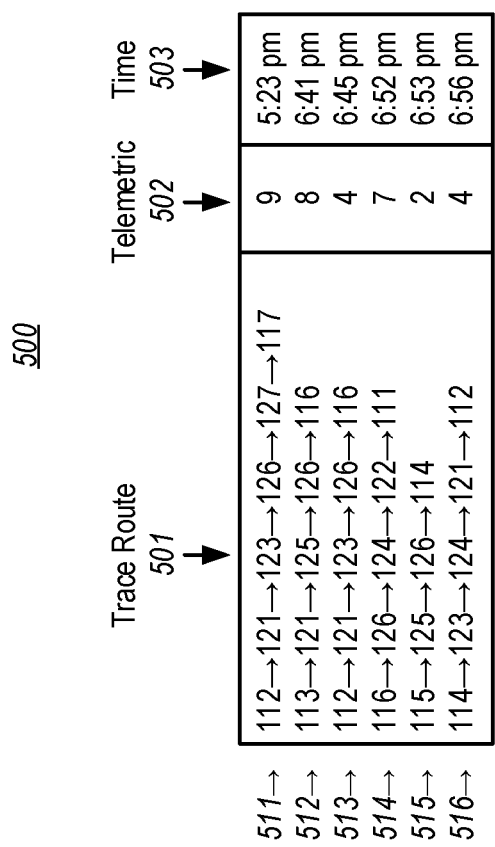
FIG. 5 illustrates an example data set that might be gathered for multiple communications occurring within the network environment of FIG. 1.

FIG. 5 illustrates an example data set 500 that might be gathered for multiple communications occurring within the network environment 100 of FIG. 1. The example data set 500 includes trace route data (see column 501) telemetric data (see column 502), and time data (see column 503) for each of six communications (see rows 511 through 516) that occurred within the network environment 100.

For instances, row 511 includes trace route data, telemetry data, and time data for the communication 400 of FIG. 4. Of course, the principles described herein are not limited to such a simple case of six communications performed in a simple and small network, which is just provided by way of being a manageable example. In practice, the data set 500 might thousands, millions, or more, communications, occurring with the network environment including innumerable computing systems and intermediaries (e.g., perhaps the entirety of the Internet).

Here, the telemetric data is reduced to a score between 1 and 10, with 10 indicating high communication quality, and 1 indicating low communication quality. Communications 511, 512 and 514 indicate a relatively high communication quality (9, 8 and 7, respectively). On the other hand, communications 513, 515 and 516 indicate a relatively low communication quality (below 5). The principles described herein are not limited to the structure of the telemetry data, nor how the telemetric data is generated. In one example, the telemetry data is much more descriptive about the type of any problem encountered in the communication. For instance, for communication 515, rather than just have a simple telemetric summary (2 on a scale of 1 to 10), the telemetry might include an indication that the communication was dropped, that there was a certain amount of delay in the communication, that the signal-to-noise was at a certain level, that the communication had a certain number of other intermediaries between the origin and destination, that the intermediary had a particular configuration, and so forth.

The example data set 500 may include a time (see column 503) at which the respective communication happened. The time may be represented using any format such as Universal Coordinated Time (UTC). Alternatively, the time might be a logical time (such as a monotonically increasing communication identifier). However, in the illustrated example, the times are represented as minutes in local time (the date is omitted since the times all occurred on the same day in the example).

Referring back to FIG. 3, the content of dashed-lined box 310 may be performed each time a performance problem has been detected as occurring within the network (act 311). This detection may be performed using at least some of the gathered telemetric and trace route data (which was gathered in act 301). For instance, in FIG. 2, the fault detection component 220 receives data gathered and stored in the database 201. The fault detection component 220 may query the database 201 for gathered data. As previously mentioned, an example of that gathered data is the data set 500 of FIG. 5. Using the data set 500 as an example, the fault detection component 220 may detect that the telemetrics declined suddenly between the communication associated with row 512 which occurred at 6:41 pm and the communication associated with row 513 which occurred at 6:45. Using this information, the fault detection component 220 may detect that a fault occurred at 6:45 pm.

The fault detection component 220 might continuously operate so as to detect problems substantially when they have occurred. Alternatively, or in addition, the fault detection component 220 might detect problems in response to a query. For instance, upon starting work in the morning, an Information Technology employee might query for any problems that have occurred in the last 16 hours since the employee was last at work. The fault detection component 220 might then evaluate the database 201 to identify times at which problems in telemetry have occurred.

Returning to FIG. 3, once a performance problem is identified as having occurred (act 311), multiple real-time communications are identified which have occurred around a time that the performance problem occurred in the network (act 312). For instance, if a performance problem is identified as having occurred at 6:45 pm (using data set 500), a window of time may be selected around the time of the performance problem. Then, any real-time communications that happened within this period of time may be identified. For instance, if the window of time is 10 minutes before to 10 minutes after the detected performance problem of 6:45 pm, all communications between 6:35 pm and 6:55 pm might be identified. In the data set 500 of FIG. 5, the four communications represented by row 512 (occurring at 6:41 pm), row 513 (occurring at 6:45 pm), row 514 (occurring at 6:52 pm), and row 515 (occurring at 6:53 pm) may be identified. Other windows of time may also be suitable. For instance, the window of time might begin with the time of the performance problem and go until some duration after the time of the performance problem. As another example, the window of time might begin some duration prior to the time of the performance problem, and end at the time of the performance problem.

Referring to FIG. 2, this communication set gathering may be performed by an input communication set gathering component 231, which may be one of the fault analysis components 230. The input communication set gathering component 231 receives the time of the performance problem from the fault detection component 220, and may query the database 201.

The trace route data is then aggregated (act 313) using the multiple real-time communications that were identified as occurring around the time of the performance problem (act 312). Referring to FIG. 2, this aggregation may be performed by the aggregation component 232, which may also be one of the fault analysis components 230. As one example, the aggregation component 232 may construct an aggregated acyclic graph by aggregating the trace route data for the identified input communication set. For instance, the aggregated acyclic graph might include a graph in which the multiple input communications are superimposed such that the same computing system or intermediary is represented as a single node in the graph, and in which each graph link represents a distinct link between network nodes.

Figure 6:
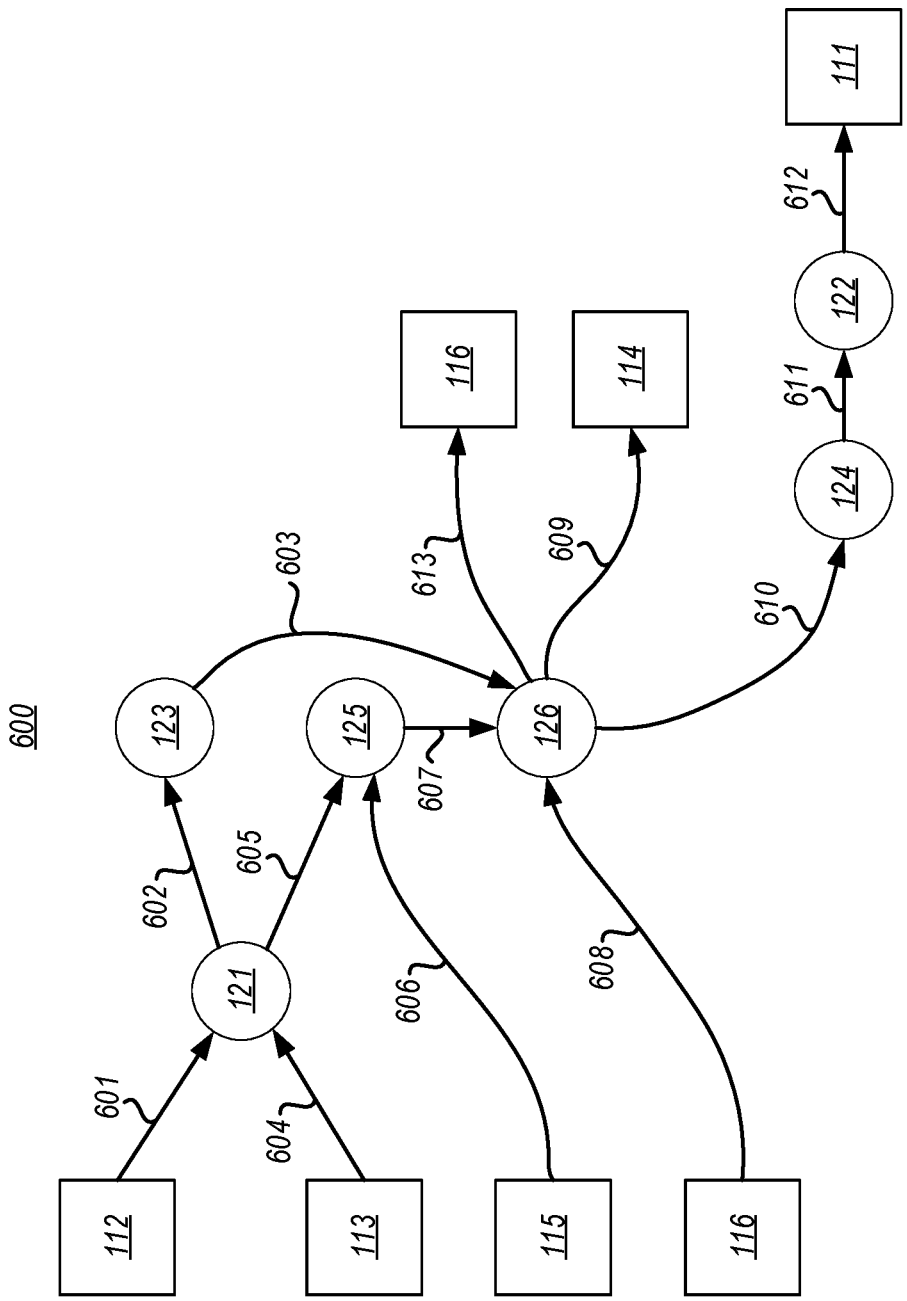
FIG. 6 illustrates an example directed acyclic graph that represents an aggregation of the trace route data for the four communications represented by the second to fifth rows of the data set of FIG. 5.

FIG. 6 illustrates an example directed acyclic graph that represents an aggregation of the trace route data for the four communications represented by rows 512 through 515 (the input communication set in the example). The links 604, 605, 607 and 613 represent an ordered path of the trace route for the communication of row 512 of FIG. 5. The links 601, 602, 603 and 613 represent an ordered path of the trace route for the communication of row 513 of FIG. 5. The links 608, 610, 611 and 612 represent an ordered path of the trace route for the communication of row 514 of FIG. 5. The links 606, 607 and 609 represent an ordered path of the trace route for the communication of row 515 of FIG. 5.

Thus, node 121 of FIG. 6 is a superimposed node distinctly representing intermediary 121 of FIG. 1, which was used for the two communications of rows 512 and 513. Node 122 of FIG. 6 is a node that distinctly represents intermediary 122 of FIG. 1, which was used for a single communication of row 514. Node 123 of FIG. 6 is a node that distinctly represents intermediary 123 of FIG. 1, which was used for a single communication of row 513. Node 124 of FIG. 6 is a node that distinctly represents intermediary 124 of FIG. 1, which was used for a single communication of row 514. Node 125 of FIG. 6 is a superimposed node distinctly representing intermediary 125 of FIG. 1, which was used for the two communications of rows 512 and 515. Node 126 of FIG. 6 is a superimposed node distinctly representing intermediary 126 of FIG. 1, which was used for all four communications of rows 512, 513, 514 and 515.

In addition to aggregating the trace routes, the telemetry data may also be aggregated for each network node. This aggregation may also be performed by the aggregation component 232 of FIG. 2. In a simple example, for each of the network nodes 121 through 126 involved in at least one communication of the input communication set, an aggregated telemetry data is obtained by averaging the telemetry data for each communication that passed through the network node.

Thus, in this simple example, for network node 121, the aggregated telemetric data might be 6 (the average of 8 for row 512, and 4 for row 514). For network node 122 through 124, the aggregated telemetric data might be the same as the single row in which the network nodes appeared (7 for network node 122 corresponding to row 514, 4 for network node 123 corresponding to row 513, and 7 for network node 124 corresponding to row 514). For network node 125, the aggregated telemetric data might be 5 (the average of 8 for row 512, and 2 for row 515). For network node 126, the aggregated telemetric data might be 5.25 (the average of 8 for row 512, 4 for row 513, 7 for row 514, and 2 for row 515). This aggregated telemetric data might be considered to be a hazard score, where lower scores indicate a greater hazard. An alternative method for obtaining a hazard score will be described further below.

Referring to FIG. 3, the method 300 then includes identifying a potential problem network node in the network using the aggregation of the trace route data for at least some of the multiple real-time communications that were identified as occurring around the time of the performance problem (act 314). Referring to FIG. 2, this identification of problem nodes may be performed by the problem node identification component 233, which may also be one of the fault analysis components 230.

In one embodiment, this identification of problem nodes is also done by using the aggregated telemetric data. For instance, in the above example in which the telemetry data for all communications going through a network node is averaged in order to determine the aggregated telemetric score, the network nodes may be ranked by their aggregated telemetric score. Network node 123 has the most severe hazard score at 4, then network node 125 at 5, then network node 126 at 5.25, then network node 121 at 6, then network nodes 122 and 125 each at 7. The identification may determine that each network node having aggregated telemetric data that meets a threshold is determined to be a potential problem node. For instance, each network node having an aggregated telemetric data at or below 5 might be determined to be a potential problem network node. Thus, the network nodes 123 and 125 are potentially contributing to the performance problem of the network, with network node 123 being the more likely candidate for contributing to adverse network performance.

Returning to FIG. 3, once one or more problem network nodes are identified (act 314), the problem network nodes may be communicated to a computing system associated with an entity that is affected by the detected performance problem (act 315). For instance, this reporting may be performed by the reporting component 240 of FIG. 2. As an example, the reporting component 240 may report the problem network node 123 to computing system 112 and/or 116 since they are endpoints in the communication represented by row 513 (which includes intermediary 123) for which there was a telemetric data of a mere 4 out of 10. Likewise, the reporting component may report the problem node 125 to computing system 114 and 115 since they are endpoints in the communications represented by row 515 (which includes intermediary 125) for which there was telemetric data of a very low 2 out of 10. If there are multiple potentially problem network nodes, they might be displayed in order of ranking.

In the above example, problematic network nodes were identified using aggregated telemetric data for each network node. However, problematic network nodes might also be identified based on the observed performance problem (detected in act 311). For instance, suppose that the observed performance problem was that calls were being dropped. Then, the telemetric data related to that specific performance problem may be evaluated for each network node.

For instance, the fraction of calls passing through a network node may be calculated as the number of calls passing through the network node divided by the total number of calls. In the example above, there are four total calls in the input communication set (corresponding to rows 512 through 515). For network node 121, this fraction would be 0.5 since there are two of those communications that pass through the network node (corresponding to rows 512 and 513). Then, a performance specific fraction is calculated. As an example, a "call drop contribution per graph node" might be calculated as the number of dropped calls passing through the network node 121 (let's say two in our example) divided by the total number of dropped calls (let's say three in our example). Thus, in this example, the call drop contribution for network node 121 would be 0.667 (or 2/3). A call drop hazard score for network node 121 may be calculated as the call drop contribution (2/3) divided by the fraction of calls passing through that node (1/2). This would be result in a call drop hazard score of 4/3. Call drop hazard scores may similarly be determined for each of the other intermediaries 122 through 126. Thus, network nodes might be evaluated based on aggregated telemetry data related to the specific detected performance problem In one embodiment, network nodes are mapped to a physical location or approximate physical location. For instance, a particular set of internet protocol addresses may be mapped to a particular building, floor, or office in a business enterprise. Referring to FIG. 2, that mapping 202 might be provided into the database 201. That way, the reporting component 240 may receive the identification of the potentially problematic network node (from the problem node identification component 232), and query the database for the physical location of each problematic network node. Then, the reporting component 240 may also report regarding the physical location of the problem network node.

In some embodiments, the problem network node might be within a network portion (e.g., a corporate intranet) managed by an entity (e.g., a corporation) that is affected by the performance problem. In that case, reporting the problem network node to the affected entity may allow that entity to employ resources to correct or troubleshoot the problem within the network portion that it manages. On the other hand, the problem network node might be outside of the network portion that is managed by the affected entity. In that case, the fact that the problem is occurring outside of the entity affected by the performance problem may be reported to the entity. That alleviates the entity having to take time to try to resolve a problem within the network portion that the entity manages, when such would be futile. In addition, the report to that entity might report the identity of the entity or service provider in which the problem appears to be occurring. Thus, the principles described herein allow for individuals to determine whether problems are occurring within their own networks, within a real-time service (e.g., voice and teleconferencing service), or perhaps just due to general Internet problems.

Accordingly, the principles described herein use telemetric and trace route data across multiple real-time communications in order to identify potentially problematic network nodes. There may be periods of time in which there are not sufficient real-time communications to be used to reliably identify potentially problematic network nodes. In that case, the principles described herein permit for the identification that there are presently insufficient telemetric and trace route data (act 302) and as a result, formulate synthetic real-time communications for these periods of time (act 303). Synthetic real-time communications might involve automatic connections or calls being made between bots on different computing systems. Such bots might be designed to issue audio or video to each other so as to simulate a connection or call between human participants.

For instance, outside of normal business hours for a given region, there might be insufficient real-time communications for applications that are business-oriented for networks that are limited to that region. Accordingly, during these times, there may be some number of synthetic real-time communications that may be performed, in order to measure telemetric and trace route data for those communications, and so as to be able to have some minimal level of real-time communications within the data set 500 to be able to detect poor network performance, and identify potential culprit network nodes.

Because the principles described herein may be performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 7, in its most basic configuration, a computing system 700 typically includes at least one hardware processing unit 702 and memory 704. The processing unit 702 may include a general-purpose processor and may also include a field programmable gate array (FPGA), an application specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, cause the computing system to perform computer-aided identification of a potential problem node in a network in response to detecting that a performance problem has occurred in the network, including computer-executable instructions that are structured such that, when executed by the one or more processors, cause the computing system to perform the following:
gather telemetric and trace route data for each of a plurality of real-time communications that occurred within a network;
detect that a performance problem has occurred in the network;
identify multiple real-time communications of the plurality of real-time communications that occurred within a predetermined window of time selected based on when the performance problem occurred in the network;
aggregate the trace route data for the multiple real-time communications that were identified as occurring around the time of the performance problem; and
identify a potential problem network node in the network using the aggregation of the trace route data for at least some of the multiple real-time communications that were identified as occurring within the predetermined window of time.

2. The computing system in accordance with claim 1, aggregating the trace route data for the multiple real-time communications comprising generating a graph in which the trace routes are superimposed such that each graph node represents a distinct network node, and each graph link represents a distinct link between network nodes.

3. The computing system in accordance with claim 2, the aggregating further comprising aggregating the telemetric data for each network node.

4. The computing system in accordance with claim 3, the aggregated telemetric data comprising a hazard score for each of at least some of the network nodes.

5. The computing system in accordance with claim 3, wherein identifying the potential problem network node comprises using the aggregated telemetric data for the potential problem network node to determine that the potential problem network node has substandard performance.

6. The computing system in accordance with claim 3, wherein the computer-executable instructions are further structured such that, when executed by the one or more processors, cause the computing system to rank two of more of the potential problem network nodes whose aggregated telemetric data represents a higher degree of hazard.

7. The computing system in accordance with claim 6, wherein the computer-executable instructions are further structured such that, when executed by the one or more processors, cause the computing system to:
cause the potential problem network nodes to be displayed in the order of the ranking.

8. The computing system in accordance with claim 1, the plurality of real-time communications comprising online conference communications.

9. The computing system in accordance with claim 1, the plurality of real-time communications comprising telephone communications.

10. The computing system in accordance with claim 1, wherein the computer-executable instructions are further structured such that, when executed by the one or more processors, cause the computing system to:
map the potential problem network node to a physical location or an approximate physical location.

11. The computing system in accordance with claim 1, wherein the computer-executable instructions are further structured such that, when executed by the one or more processors, cause the computing system to:
report the potential problem network node to a computing system associated with an entity that is affected by the detected performance problem.

12. The computing system in accordance with claim 1, wherein detecting that a performance problem has occurred in the network is configured to be performed in response to a query for problems in the network.

13. The computing system in accordance with claim 12, wherein detecting that a performance problem has occurred in the network is configured to be performed automatically using at least some of the gathered gather telemetric and trace route data.

14. A method for computer-aided identification of a potential problem node in a network in response to detecting that a performance problem has occurred in the network, the method comprising:
gathering telemetric and trace route data for each of a plurality of real-time communications that occurred within a network;
detecting that a performance problem has occurred in the network;
identifying multiple real-time communications of the plurality of real-time communications that occurred within a predetermined window of time selected based on when the performance problem occurred in the network;
aggregating the trace route data for the multiple real-time communications that were identified as occurring around the time of the performance problem; and
identifying a potential problem network node in the network using the aggregation of the trace route data for at least some of the multiple real-time communications that were identified as occurring within the predetermined window of time.

15. The method in accordance with claim 14, further comprising:
formulating synthetic real-time communications for periods of time in which the gathered telemetric and trace route data would be insufficient to detect performance problems from real real-time communications.

16. The method in accordance with claim 14, the method further comprising:
reporting the problem network node to a computing system associated with an entity that is affected by the detected performance problem.

17. The method in accordance with claim 14, the potential problem network node being within a network portion managed by an entity that is affected by the detected performance problem, the method further comprising reporting the potential problem network node to a computing system associated with the entity.

18. The method in accordance with claim 14, the potential problem network node being outside of a network portion managed by an entity that is affected by the detected performance problem, the method further comprising reporting to a computing system associated with the entity.

19. The method in accordance with claim 14, the detecting that a performance problem has occurred in the network being performed automatically using at least some of the gathered gather telemetric and trace route data.

20. A computing system comprising:
one or more processors; and
one or more computer-readable media having thereon computer-executable instructions that are structured such that, when executed by the one or more processors, cause the computing system to perform computer-aided identification of potential problem nodes in a network in response to detecting that each of multiple performance problems that have occurred in the network, including computer-executable instructions that are structured such that, when executed by the one or more processors, cause the computing system to perform the following:
gather telemetric and trace route data for each of a plurality of real-time communications that occurred within a network;
for each of multiple performance problems:
detect that a corresponding performance problem has occurred in the network;
identify multiple real-time communications of the plurality of real-time communications that occurred within a predetermined window of time selected based on when the corresponding performance problem occurred in the network;
aggregate the trace route data for the multiple real-time communications that were identified as occurring around the time of the corresponding performance problem; and
identify a potential problem network node in the network using the aggregation of the trace route data for at least some of the multiple real-time communications that were identified as occurring within the predetermined window of time.

* * * * *